Feb. 23, 1960 A. GOLDMAN 2,926,241
SQUELCH CIRCUIT
Filed May 13, 1958
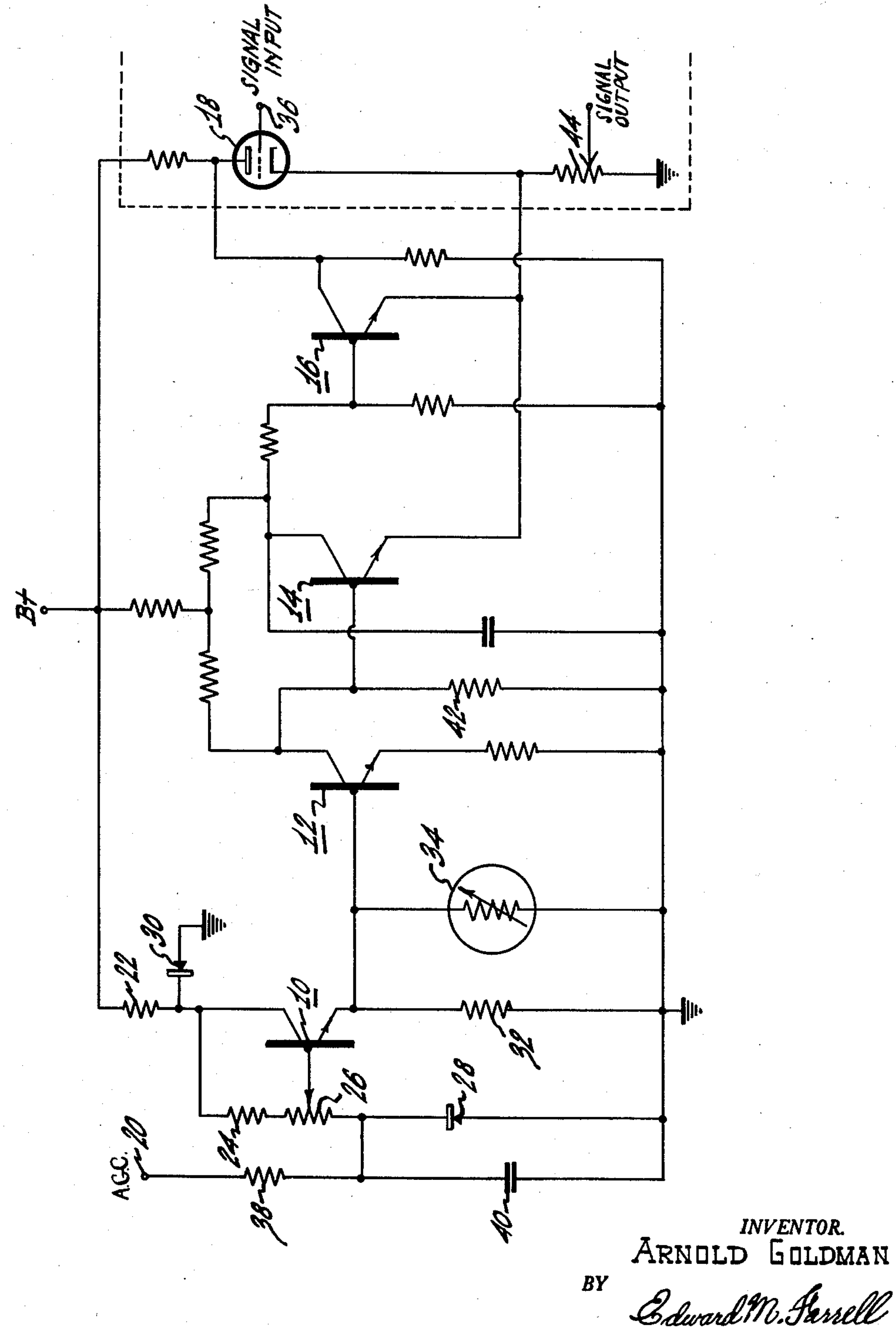
INVENTOR.
ARNOLD GOLDMAN
BY Edward M. Farrell
ATTORNEY

United States Patent Office 2,926,241

Patented Feb. 23, 1960

2,926,241

SQUELCH CIRCUIT

Arnold Goldman, Philadelphia, Pa., assignor to Tele-Dynamics Inc., a corporation of Pennsylvania Application May 13, 1958, Serial No. 734,904

8 Claims. (Cl. 250—20)

This invention relates to a squelch circuit, and more particularly to a squelch circuit operative from a low power source.

Squelch circuits have been used extensively in the past in connection with radio receivers. Normally such circuits have been used to render an amplifier inoperative until an incoming carrier signal exceeds a predetermined level.

Electronic squelch circuits have generally involved varying the bias potential associated with an amplifier. In many such cases, varying the bias potential to produce squelching has tended to introduce distortion or has involved complex circuitry. Most squelch circuits presently used which involve varying the bias potential associated with an amplifier do not provide a positive "snap" action which is necessary in many applications. Failure to provide a positive squelching or muting action when a carrier signal is below a predetermined level often results in a tendency of an amplifier to alternately block and open when the receiver receives weak signals close to the threshold level.

In designing squelch circuits for standard type receivers, it is sometimes difficult to foresee the type of environmental conditions under which such receivers must operate, especially in cases involving guided missiles, for example. Consequently, it may be difficult to design an appropriate squelch circuit during the manufacture of the overall receiving system, where standard type receivers are involved. It is therefore highly desirable to have a small compact universal type electronic squelch circuit which may be easily incorporated into different types of receivers without substantially changing the circuitry of such receivers.

It is an object of this invention to provide an improved squelch circuit.

It is a further object of this invention to provide an improved squelch circuit which is readily adaptable to be used with different types of equipment without substantially modifying the circuitry of such equipment.

It is still a further object of this invention to provide an improved squelch circuit in which a positive "snap" squelching operation is achieved.

It is still a further object of this invention to provide an improved squelch circuit which minimizes the degree of distortion in an amplifier.

It is still a further object of this invention to provide an improved electronic squelch circuit which is small, compact, does not require mechanical relays, and which may be used with different types of amplifier circuits.

In accordance with the present invention, a squelch circuit is associated with an amplifier. A pair of transistors comprises a Schmitt circuit which is connected across the amplifier to provide either a high or low impedance thereacross dependent upon the operating condition of the transistors. The amplifier is squelched when the pair of transistor devices presents a low impedance, as when an incoming carrier signal is relatively weak, and amplifies normally when the pair of transistors presents a high impedance, as when an incoming carrier signal is relatively strong. The operation of the transistors is controlled by a source of voltage representative of the strength of a carrier signal, as by an automatic gain control (AGC) voltage.

Other objects and advantages of the present invention will be apparent and suggest themselves to those skilled in the art from a reading of the following specification and claims in conjunction with the accompanying drawing in which:

The sole figure of the drawing is a schematic diagram illustrating a form of the present invention.

Referring to the sole figure of the drawing, four transistors 10, 12, 14 and 16 are connected in cascade relationship. The collector and emitter of the transistor 16 are connected across an amplifier which comprises an electron discharge device 18. A source of automatic gain control voltage, or any other signal representative of an incoming carrier signal, is applied to an input terminal 20. It is the amplitude of the AGC voltage at the input terminal 20 which determines whether or not the electron discharge device 18 is squelched or open, in a manner to be described.

The transistor 10 is an emitter follower and has a high input impedance. The transistor 10 is normally conducting with very low or no AGC voltage being applied to its base. A source of operating potential, designated as B+, is connected across a voltage dividing network comprising resistors 22, 24, a threshold level control resistor 26 and a diode 28. A diode 30 is connected across the resistor 22 to provide voltage stabilization. A resistor 32 is connected between the emitter of the transistor 10 and ground. The diode 28 provides means for protecting subsequent circuitry from overloading when a relatively large AGC voltage is applied to the terminal 20.

When no incoming signal is applied to the terminal 20, the transistor 12 is maintained in a conducting state by the voltage applied from the emitter of the transistor 10 to the base of the transistor 12. A thermistor 34, the resistance of which is variable in accordance with temperature changes, is connected between the base of the transistor 12 and ground to provide temperature compensation.

The transistor 12 being normally conductive with no incoming carrier signal causes a positive voltage to be applied to the base of the transistor 14 causing it to be non-conductive. With the transistor 14 non-conductive, the voltage applied to the base of the transistor 16 causes it to be conductive. With the transistor 16 in a conducting state, a low impedance across the anode and cathode of the electron discharge device 18 is provided since the collector and emitter of the transistor 16 is connected directly thereacross.

An input signal at the terminal 36 is applied to the control grid of the electron discharge device 18. The output signal, which may be a control signal for affecting the operation of a missile, for example, is developed across the variable resistor 44 when the amplifier is conducting normally or is "open." When the amplifier is shorted as when the transistor 16 is conducting, the signal applied to the control grid of the device 18 is ineffective. Thus, it is seen that the amplifier including the electron discharge device 18 is squelched when either no signal or a signal below a preset threshold level is received. The squelching of the amplifier prevents noise of any other undesired signals from affecting the operation of the amplifier or being developed across the resistor 44 until an incoming carrier signal exceeds a predetermined level, as determined by the setting of the resistor 26. Relay control devices may be connected to the resistor 44 to become operative when an incoming carrier signal exceeds the threshold level. While the output signal is taken from the cathode circuit of the device 18, it is understood that the input signal may be taken from the anode circuit, if desired.

It is noted that the squelching of the amplifier is obtained by a relatively simple circuit which may be incorporated into different types of existing receivers without substantially modifying the circuitry of such receivers. The normal biasing arrangement associated with the electron discharge device 18 does not have to be substantially modified to provide squelching when the circuit embodying the present invention is employed. Slight variations in biasing potential resulting from variations in the source voltage supply will not result in signals from the terminal 36 affecting the squelching operation since the electron discharge device is effectively short-circuited. The likelihood of distortion resulting from slight changes in the biasing potential is also considerably reduced by the circuit embodying the present invention.

When an incoming carrer signal is received, an automatic gain control voltage is generally developed in most conventional receivers. The AGC voltage may be applied from the input terminal 20 across a resistor 38 and a capacitor 40 to the transistor 10. An AGC voltage, being generally of negative polarity, causes a negative voltage to be developed across the resistor 32, since the transistor 10 is an emitter follower. The negative voltage applied from the emitter of the transistor 10 to the base of the transistor 12 causes a positive voltage to be developed at the collector of the transistor 12 across the resistor 42. The positive voltage from the collector of the transistor 12 to the base of the transistor 14 causes the transistor 14 to become conducting. When the transistor 14 is conducting, a negative signal voltage is applied from the collector of the transistor 14 to the base of the transistor 16 causing the transistor 16 to become cutoff. The common resistor 44 connected to the emitters of the transistors 14 and 16 provides a feedback means to produce a sharp cutoff action.

When the transistor 16 is cutoff, or non-conducting, a high impedance is connected across the anode and cathode of the electron discharge device 18 thereby "opening" the amplifier to permit normal amplification of a signal applied to the terminal 36 which is developed across the resistor 44 for control purposes. A voltage from the transistor 16 is fed back to the transistor 14 from the common resistor 44 connected to the emitters of the transistors 14 and 16 to provide a regenerative action. The regenerative action causes the transistor 14 to become conducting and the transistor 16 to become non-conducting almost instantaneously. Such circuits are commonly referred to as Schmitt circuits and provide a positive "snap" action (i.e., an almost instantaneous change from a conducting to a nonconducting state and vice versa). The positive "snap" action prevents erratic performance of the electron discharge device 18.

The Schmitt circuit including the transistors 14 and 16 are primarily related to the squelching. The transistors 10 and 12 are utilized for amplification, to provide proper input impedance and to permit circuitry relating to threshold control, temperature compensation and proper phasing.

The squelch circuit shown is small and compact and is readily adapted to be connected to existing different types of systems without changing the circuitry involved in such equipment to any great degree. Since the biasing arrangement associated with the amplifier is not changed to produce the squelching action, the possibility of spurious signals or small bias change causing distortion is minimized. One of the main features of the present invention, however, is in the positive "snap" action provided. Such a "snap" action is especially important in systems involving guided missiles, for example, where erratic performance must be avoided.

What is claimed is:

1. A squelch circuit for an amplifier comprising a bi-stable network including a transistor having base, collector and emitter electrodes, means for connecting the collector and emitter of said transistor across said amplifier to provide a relatively high or low impedance thereacross dependent upon the operating condition of said bi-stable network, a low impedance being provided when said transistor is conducting and a high impedance being provided when said transistor is non-conducting, and means for applyng a signal to said bi-stable network to switch the operating condition thereof.

2. A squelch circuit for an amplifier comprising a pair of transistors forming a bi-stable network, said transistors each including base, emitter and collector electrodes, means for connecting the emitter and collector electrodes of one of said pair of transistors to provide a relatively high or low impedance across said amplifier dependent upon the operating state of said bi-stable network, a low impedance being provided when said one of said pair of transistors is conducting and a high impedance being provided when said one of said pair of transistors is non-conducting, and means for applying a voltage corresponding to a carrier signal to said pair of transistors to switch the operating state of said bi-stable network.

3. A squelch circuit for an amplifier comprising a pair of semi-conductor devices forming a network having two stable operating states, said semi-conductor devices each including base, emitter and collector electrodes, means for connecting the emitter and collector electrodes of one of said pair of semi-conductor devices to provide a relatively high or low impedance across said amplifier dependent upon the operating state of said network to squelch said amplifier for one operating state and to permit normal amplification by said amplifier for the other operating state of said network, a low impedance being provided when said one of said pair of semi-conductor devices is conducting and a high impedance being provided when said one of said semi-conductor devices is non-conducting, and means for applying a signal to said pair of semi-conductor devices to switch the operating state of said bi-stable network.

4. In combination with an amplifier including an electron discharge device having an anode, cathode and control grid, a squelch circuit comprising a pair of transistors forming a bi-stable network, said transistors each including base, emitter and collector electrodes, means for connecting the emitter and collector electrodes of one of said transistors across the anode and cathode of said electron discharge device to provide a relatively high or low impedance to squelch or unsquelch said amplifier dependent upon the operating state of said bi-stable network, and means for applying an automatic gain control voltage to said pair of transistors to switch the operating state of said bi-stable network.

5. In combination with an amplifier including an electron discharge device having an anode, cathode and control grid, a squelch circuit comprising a source of automatic gain control voltage, first and second transistors forming a bi-stable network, said transistors each including base, emitter and collector electrodes, a source of threshold level voltage to maintain said first transistor normally non-conductive and said second transistor normally conductive when said automatic gain control voltage is below a predetermined level, means for connecting the emitter and collector electrodes of said second transistor across the anode and cathode of said electron discharge device to squelch said amplifier when said second transistor is conducting, means for applying said automatic gain control voltage to switch said first transistor from a non-conducting to a conducting state and said second transistor from a conducting to a non-conducting state to unsquelch said amplifier when said automatic gain control voltage exceeds said predetermined level.

6. In combination with an amplifier including an electron discharge device having an anode, cathode and control grid, a squelch circuit comprising a high impedance input circuit, a source of automatic gain control voltage, means for applying said automatic gain control voltage to said high impedance input circuit, first and second transistors forming a bi-stable network, said transistors each including base, emitter, and collector electrodes, a source of threshold level voltage to maintain said first transistor normally non-conductive and said second transistor normally conductive when said automatic gain control voltage is below a predetermined level, means for connecting the emitter and collector electrode of said second transistor across the anode and cathode of said electron discharge device to squelch said amplifier when said second transistor is conducting, and means for applying said automatic gain control voltage from said high impedance input circuit to switch said first transistor from a non-conducting to a conducting state and said second transistor from a conducting to a non-conducting state to unsquelch said amplifier when said automatic gain control voltage exceeds said predetermined level.

7. The invention as set forth in claim 6 wherein said high impedance input circuit includes a variable threshold level control.

8. The invention as set forth in claim 7 wherein said high impedance input circuit includes a diode device to prevent said automatic gain control voltage from overloading subsequent circuitry.

References Cited in the file of this patent

UNITED STATES PATENTS

| | | |
|---|---|---|
| 2,501,120 | Carlson | Mar. 21, 1950 |
| 2,681,989 | Cunniff | June 12, 1954 |